United States Patent Office.

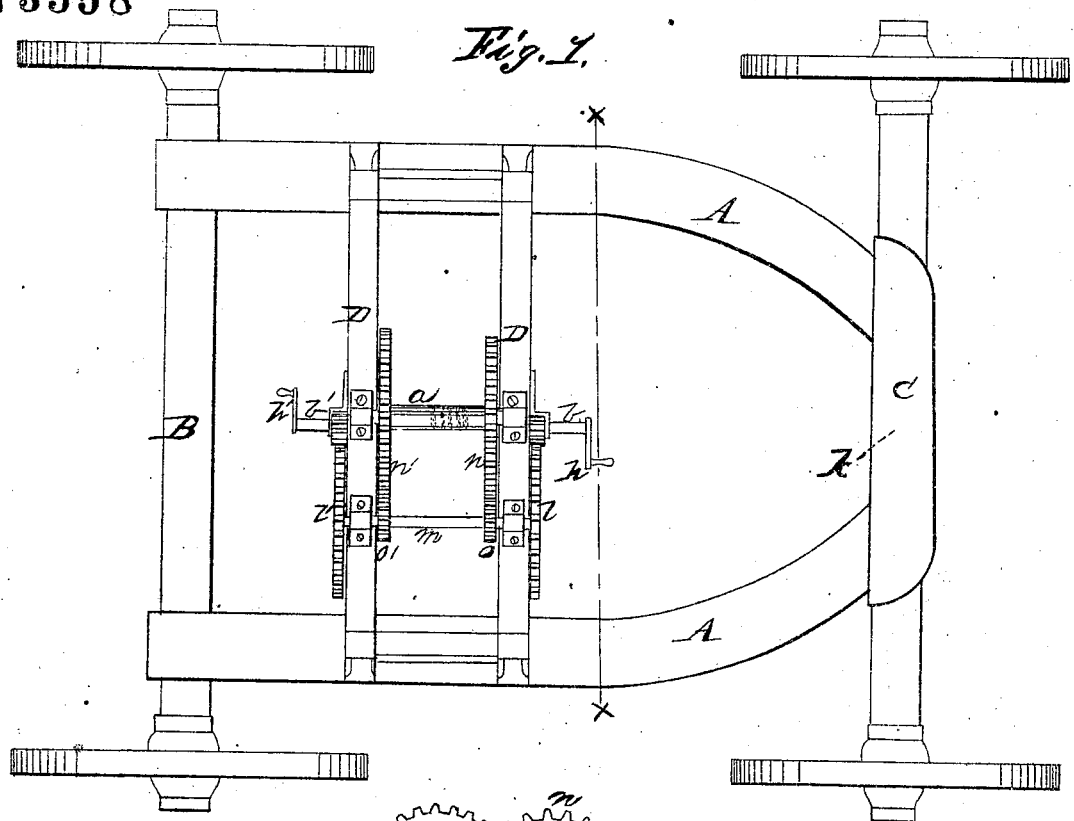
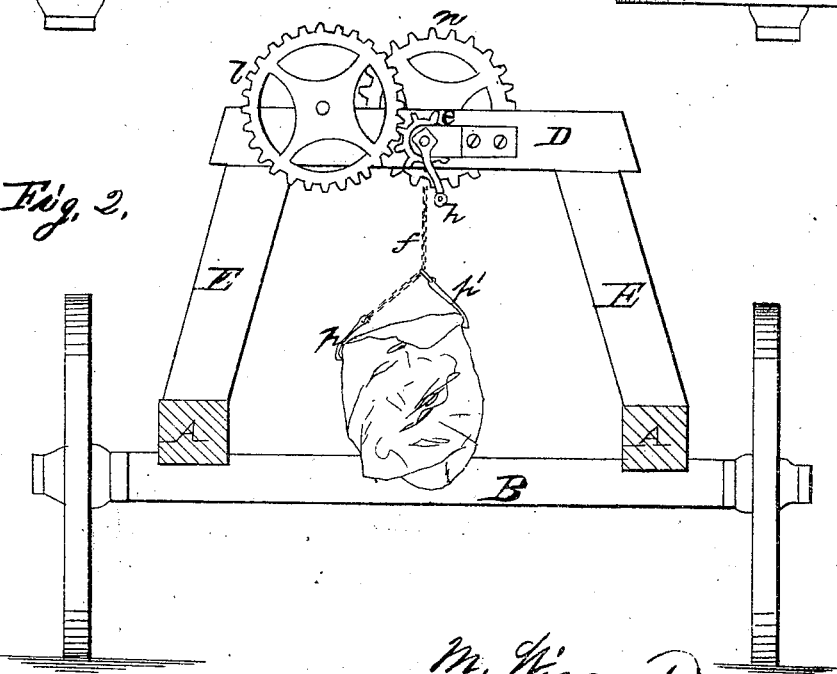

MOSES WIEAND AND GEORGE GORR, OF EMAUS, PENNSYLVANIA.

Letters Patent No. 73,558, dated January 21, 1868.

IMPROVEMENT IN STONE AND STUMP-EXTRACTOR.

*The Schedule referred to in these Letters Patent and making part of the same.*

TO ALL WHOM IT MAY CONCERN:

Be it known that we, MOSES WIEAND and GEORGE GORR, of Emaus, in the county of Lehigh, and State of Pennsylvania, have invented certain new and useful Improvements in Portable Power, for use on farms, &c.; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention, we will proceed to describe it.

Our invention consists in a novel construction of a portable power for use by farmers and others, for extracting and conveying stumps, stones, and similar heavy bodies.

Figure 1 is a top plan view, and

Figure 2 is a transverse sectional view taken on the line $x\ x$ of fig. 1, and looking from the front rearward.

In constructing our apparatus, we provide two or more strong timbers, A, united at their rear end by an axle, B, suitably prepared to receive the hind wheels of a wagon, as shown in the drawings. At the front end these timbers A are united by a cross-piece, C, provided with a hole at its centre, so that it may be placed upon the front axle of an ordinary wagon, and secured thereto by a king-bolt, $k$, as represented in fig. 1. Upon the timbers A is built an upright frame, consisting of the posts E and the cross-pieces D, as shown in fig. 2, upon which the mechanism is mounted. This mechanism consists of a main shaft, $a$, having a gear-wheel, $n$, secured thereon, and gearing into a pinion, $o$, on a counter-shaft, $m$, on the end of which is a gear-wheel, $l$, engaging with another pinion, $e$, on a short shaft, $b$, to which a crank, $h$, is secured. A chain, $f$, is attached to the main shaft $a$, and has a hook, $p$, secured to its lower end, there being a similar hook, $p'$, attached to a ring that is slipped loosely on the chain $f$, so that when the hooks $p$ and $p'$ are attached to a stone or similar object, the tension of the chain, in lifting the weight, will tend to draw the hooks together, and thereby cause them to retain their hold upon the weight, as represented in fig. 2. By this arrangement of the sliding hook on the chain, it will be seen that the hooks will readily adjust themselves to objects or weights of various sizes, with no other care than simply hooking them on and tightening up the chain.

In case it be desired to increase the power of the machine, there may be another train of gearing placed on the opposite side, as represented by the wheels $n'\ o'\ l'\ e'$, with another shaft, $b'$, and crank, $h'$, by which means another person may operate from that side at the same time.

By these means a very strong, yet simple and cheap machine, is produced, that is specially adapted to the wants of the farmer in clearing his fields of stumps, stones, and similar obstructions, which it is necessary to remove in order to prepare the land for the use of the reaping-machine and similar agricultural implements. By this method of constructing the frame, it can be readily mounted on the wheels of an ordinary wagon, with which the farmer is necessarily provided, thereby saving much expense; and when thus mounted, the stump or stone, after being extracted, can be at once conveyed away without loss of time in detaching it.

It is obvious that the machine may be used for any similar purpose, wherever power is required; and by being thus rendered portable, it can be readily conveyed from place to place, or from farm to farm, as may be required. If desired, as in digging wells and similar purposes, it may be dismounted and used as a stationary power, it being thus adapted to all the varying wants of the farm or neighborhood.

Having thus described our invention, what we claim, is—

The portable power, consisting of the mechanism arranged substantially as described, and provided with the chain $f$, having the stationary hook $p$ and the sliding hook $p'$, all mounted on the frame, constructed as set forth.

MOSES WIEAND,
GEORGE GORR,

Witnesses:
  E. H. BANK,
  A. F. WILTMAN.